United States Patent [19]

Lind et al.

[11] Patent Number: 4,821,281
[45] Date of Patent: Apr. 11, 1989

[54] HOLLOW CATHODE GLOW DISCHARGE RING LASER ANGULAR RATE SENSOR

[75] Inventors: Bruce J. Lind, Forest Lake; Hendrik J. Oskam, Edina, both of Minn.

[73] Assignee: Honeywell Inc., Minneapolis, Minn.

[21] Appl. No.: 907,545

[22] Filed: Sep. 15, 1986

[51] Int. Cl.$^4$ .............................................. H01S 3/083
[52] U.S. Cl. ...................................... 372/94; 372/85; 372/87; 372/88; 356/350
[58] Field of Search ...................... 372/94, 85, 87, 88; 356/350

[56] References Cited

U.S. PATENT DOCUMENTS

| | | | |
|---|---|---|---|
| 3,390,606 | 7/1968 | Podgorski | 356/350 |
| 3,473,143 | 10/1969 | Simmons et al. | 372/94 |
| 3,868,593 | 2/1975 | Fukuda et al. | 372/56 |
| 3,931,589 | 1/1976 | Aisenberg et al. | 372/88 |
| 4,007,431 | 2/1977 | Abbink et al. | 372/88 |
| 4,031,428 | 6/1977 | Tokudome et al. | 315/111.01 |
| 4,158,821 | 6/1979 | Bresman | 372/88 |
| 4,190,364 | 2/1980 | Ljung et al. | 356/50 |
| 4,257,014 | 3/1981 | Hattori et al. | 372/88 |
| 4,287,484 | 9/1981 | Wang et al. | 372/23 |
| 4,380,078 | 4/1983 | Wang et al. | 372/62 |
| 4,420,835 | 12/1983 | Hattori et al. | 372/88 |
| 4,667,162 | 5/1987 | Broberg et al. | 372/94 |
| 4,670,691 | 6/1987 | Podgorski | 372/94 |
| 4,672,623 | 6/1987 | Mellum et al. | 372/87 |
| 4,672,624 | 6/1987 | Ford | 372/87 |

OTHER PUBLICATIONS

"Helium Singlet and Triplet Metastable Number Densities in Hollow-Cathode/Metal-Vapour Lasers", J. Phys.D: Appl. Phys., vol. 11, 1978, A. I. McIntosh et al; pp. 301-311.

"Hollow-Cathode Glow Discharge in Hydrogen and the Noble Gases", Journal of Applied Physics, vol. 37, No. 6, 2405-2412, May, 1966, D. J. Sturges and H. J. Oskam.

"Studies of the Properties of the Hollow Cathode Glow Discharge in Helium and Neon", by D. J. Sturges and H. J. Oskam, Journal of Applied Physics, vol. 35, No. 10, 2887-2894, 1964.

"A Qualitative Theory of the Medium Pressure Hollow Cathode Effect", Physica 37, 457-466, by D. J. Sturges and H. J. Oskam.

"Hollow-Cathode Transverse Discharge He-Ne and He-Cd+ Lasers" Applied Physics 2, 143-150, 1973, by S. C. Wang and A. E. Siegman.

Primary Examiner—James W. Davie
Assistant Examiner—Xuan T. Vo
Attorney, Agent, or Firm—Robert A. Pajak

[57] ABSTRACT

A ring laser angular rate sensor construction utilizes an anode-cathode configuration which generates a glow discharge region in the propagation path of the laser beams. The anode-cathode construction provides a hollow cathode and effect for a ring laser. Specifically the ring laser block incorporates a tubular cavity which forms in part a cathode. A slot is provided into the block to provide an electrically insulated anode to produce the hollow cathode effect and the generation of counter-propagating laser beams.

6 Claims, 3 Drawing Sheets

HOLLOW CATHODE GLOW DISCHARGE RING LASER ANGULAR RATE SENSOR

BACKGROUND OF THE INVENTION

This invention relates to a novel construction for a ring laser angular rate sensor and more particularly to the anode-cathode electrodes for generating the laser beams of the sensor.

After years of development, ring laser angular rate sensors, commonly referred to as ring laser gyros, have become commercially successful products and are rapidly replacing conventional mechanical angular rate sensors in many applications. Most commercial ring laser angular rate sensors use a mechanically and thermally stable block construction and mechanical dither concepts taught in U.S. Pat. No. 3,390,606, issued to Podgorski, U.S. Pat. Nos. 3,467,472 and 3,373,650, issued to Killpatrick, which are all assigned to the assignee of the present invention. The above-referred to patents are incorporated herein by reference thereto.

Ring laser angular rate sensors, of the type referred to, commonly utilize a block of material that is dimensionally stable, both thermally and mechanically. The block usually includes a plurality of interconnected gas-containing tunnels or passages which form a closed-loop path in the shape of a triangle, a rectangle, or any polygonal path. At each intersection of a pair of interconnecting tunnels is a reflective surface provided by a mirror mounted on the block. This arrangement of mirrors and interconnected tunnels form an optical closed-loop path. Further, at least one anode and one cathode are each mounted on the block in communication with the gas. Each of the components, including the mirrors, anode, and cathode must be sealed to the block to form a gas tight seal. The block is usually filled with a lasing gas such as a mixture of helium and neon. If a sufficiently large electric potential is applied between the anode and cathode, a discharge current will flow therebetween and will result in a production of a pair of counter-propagating laser beams within the block.

Ring laser angular rate sensors, and specifically ring lasers, known in the art, utilize a anode-cathode combination which is in communication with the gas containing closed loop cavity. A sufficiently large direct current electric potential is applied between the anode and cathode to generate a direct electrical current between the anode and cathode through the gas. The electrical current through the gas creates distinct gas discharge regions of ionized gas atoms which are dependent on the cathode-anode configuration. In ring lasers of the prior art, there usually exists (i) a cathode fall discharge region nearest the cathode surface, (ii) a negative glow discharge region in the hollow cathode, (iii) a positive column discharge in portions of the hollow cathode cavity, portions of the closed-loop optical cavity defined by the tunnels, and in proximity of the anode, and (iv) an anode fall discharge region in close proximity to the anode surface.

As is well understood by those skilled in the art, the positive column discharge will contain a population of excited gas atoms (population inversion) which will emit photons and begin the process of creating counter-propagating laser beams along the optical closed-loop path. The laser beams, once established, continually pass through the positive column discharge and generally collinear with the direction of current flow of the gas discharge current within the positive column.

The positive column discharge in the closed-loop cavity of a ring laser gives rise to gas circulation within the optical closed-loop cavity. Particularly, the positive column discharge in ring laser angular rate sensors of the prior art gives rise to gas circulation collinear with the counter-propagating laser beams of the ring laser and collinear with the discharge current direction within the positive column. This is thought to be attributed to momentum exchange between charged particles and the walls and charged particles and neutral particles, sometimes referred to as the Langmuir gas flow. In positive column discharge ring laser angular rate sensors of the prior art, this momentum exchange gives rise to moving gain atoms in the gas collinear with the laser beams. This results in large bias effects in the performance of the ring laser angular rate sensor. This bias appears as a difference in path length in the absence of rotation. This results in a false or biased sensor readout signal which results in an erroneous rotation rate indication or bias. Further, the positive column discharge ring laser angular rate sensors also gives rise to temperature gradients within the laser block which also impacts the bias and bias stability of the sensor.

In order to minimize the effects on the performance of the ring laser angular rate sensor due to positive column discharge operation, a symmetrical split DC discharge circuit has been utilized to provide "bias-balancing" and improve bias stability. This technique comprises, commonly, either a single cathode and a pair of anodes, or a single anode and a pair of cathodes symmetrically placed along the optical path length traversed by the laser beams. Two positive column discharges are created. The two discharges have opposite polarity as seen by the counter-propagating laser beams. In triangular ring lasers known in the art, the positive column created by the anode-cathode combination selected, results in a positive column in one direction, passing one of the laser mirrors, and results in a second positive column in the opposite direction, passing another of the laser mirrors. This unfortunately exposes the mirrors to the ionized gas in the form of the positive column discharge which can degrade the mirror performance.

A DC positive column discharge technique for ring lasers, specifically for ring laser angular rate sensors, have other disadvantages including, among others, stability of the gas discharge since a positive column exhibits a negative impedance which increases the tendency of the discharge to oscillate.

OBJECTS OF THE INVENTION

It is an object of the invention to provide a gas discharge technique for a ring laser which diminishes gas flow collinear with the counter-propagating laser beams associated with a positive column discharge to improve the performance of the ring laser sensor. It is another object of the invention to provide a hollow cathode-anode gas discharge arrangement which enhances start-up and allows lower operating voltages. It is another object of the invention to provide a gas discharge technique for ring laser angular rate sensors which minimizes exposure of the mirrors to plasma. It is another object of the invention to provide improved stability by eliminating the use of a positive column discharge in the tunnels forming the optical closed-loop path of a ring laser thereby obtaining a positive impedance discharge.

BRIEF DESCRIPTION OF THE INVENTION

The present invention provides a ring laser which utilizes a gas impervious block containing at least three tunnels which meet to form a closed-loop, gas containing, cavity and allow passage of laser beams therethrough. A pair of electrodes are positioned in alignment with one of the tunnels, and positioned relative to each other to support a current through the gas and establish a glow discharge region within a portion of one of the tunnels to induce a pair of counter-propagating laser beams to propagate through the established glow discharge region in a direction transverse to the direction of the discharge current and thereby establish a pair of counter-propagating laser beams.

DETAILED DESCRIPTION OF THE INVENTION

Figure 1:
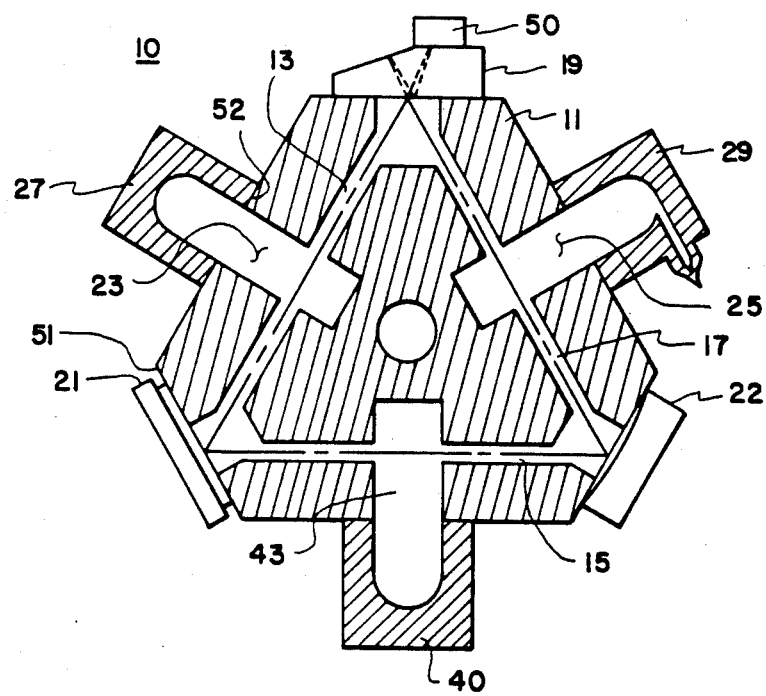
FIG. 1 is a plan view of a ring laser angular rate sensor which utilizes the split DC discharge current path for creating a positive column discharge.

Referring now to FIG. 1, there is disclosed a pictorial representation of a gas-filled ring laser angular rate sensor 10 constructed in a manner known in the prior art. Sensor 10 comprises a block 11 made of a quartz-like material such as Cervit, Zerodur, or the like or glasses such as BK-7, (letter number combinations are Schott optical commercial designations). A plurality of three interconnected tunnels 13, 15, and 17 are bored within block 11 at angles to each other to form a triangular-shaped cavity. Mirror assemblies 19, 21, and 22 are bonded to end surfaces of block 11 which form the intersection of each of the tunnels 13, 15, and 17, respectively. Each mirror functions to reflect light from one tunnel into the next thereby forming a closed-loop optical path. A pair of anodes 27 and 29 are bonded to end surfaces of laser block 11 and adapted to communicate with laser tunnels 13 and 17, respectively, through interconnecting cavities 23, and 25, respectively. A quantity of lasing gas is adapted to be contained within the tunnels 13, 15, and 17, and other tunnels in communication therewith. A gas may be inserted into the block cavities through one of the anode cavities, e.g. 25, used as a fill-tube and sealable port, e.g. anode 29.

A cathode 40 is bonded to an end surface of laser block 11 and in communication with the optical closed-loop cavity through interconnecting cavity 43. Cathode 40 is symmetrically located relative to anodes 27 and 29, and tunnels 13, 15, and 17. These symmetrical locations of the pair of anodes and the single cathode is intended to reduce the gas flow effects, discussed above, which can adversely effect the performance of the rate sensor, as is well known.

In operation with a sufficiently large potential applied between the cathode and the anodes, a first discharge current flows from cathode 40 out into cavity 15 toward mirror 21 and through tube 13 to anode 27. A positive column discharge is created along the current discharge path except in close proximity to regions near anode 27 and cathode 40. In these close proximity regions, there exists the anode fall discharge region, cathode fall discharge region and negative glow discharge region, as is well known. Similarly, a second discharge current flows through cathode 40 out into tube 15 toward mirror 22 and through tube 17 to anode 29. Like the first discharge current, a positive column discharge is created along the path of the second discharge path. These two discharge currents are usually controlled in intensity, and more specifically, the currents are usually intended to be equal. The discharge current's function is to ionize the lasing gas and provide a positive column discharge. This creates the population inversion of atoms which results in emitted photons. The emission of the photons, in turn, then creates a pair of counter-propagating laser beams within the closed-loop optical cavity in a well known manner. It will be appreciated by those skilled in the art that ring laser angular rate sensors with a rectangular lasing path or other optical cavity configurations, including a cubic cavity, are constructed in a similar manner as just described.

Each of the aforementioned mirrors perform functions in addition to redirecting the laser beams about the cavity. Mirror 19 may be constructed so as to be partially transmissive for providing a readout beam signal to be directed toward a photo sensitive means 50. Mirror 22 is preferably curved so as to aid in the alignment and focusing of the counter-propagating laser beams within the cavity. Lastly, mirror 21 may be, in part, a transducer for cavity path length control in a well known manner. A suitable readout device 50 is disclosed in U.S. Pat. No. 4,152,072, issued to Hutchings and is incorporated herein by reference thereto. The construction of the ring laser angular rate sensor described above and its performance are in accordance with the basic operating principles of prior art ring laser angular rate sensors.

Figure 2:
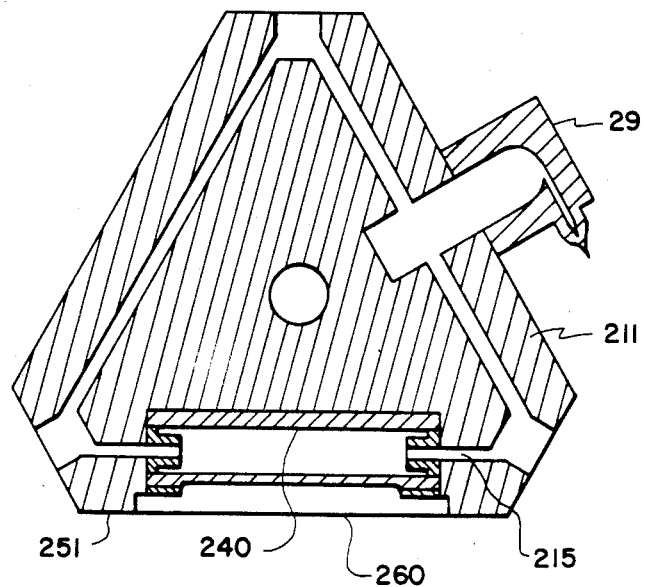
FIG. 2 is a plan view of a ring laser angular rate sensor in accordance with the present invention.

Shown in FIG. 2 is a ring laser angular rate sensor constructed in accordance with the present invention. Components shown in FIG. 2 with similarly arranged and functioning components as illustrated in FIG. 1 have the same numeral designations as those in FIG. 1. FIG. 2 further illustrates a hollow cathode and anode in accordance with the present invention.

Shown in FIG. 2, is a ring laser block 211 having tunnels 213, 215, and 217 similarly arranged as tunnels 13, 15, and 17 of FIG. 1. Anodes 27 and 29, cathode 40, and passages 23 and 43 shown in FIG. 1 have been eliminated and replaced by the anode-cathode configuration as will now be described with reference to FIG. 2, detailed view shown in FIG. 3, and end view illustrated in FIG. 4. Combination anode and fill tube 29 is still shown in FIG. 2, but only serves as a gas fill tube.

Figure 3:
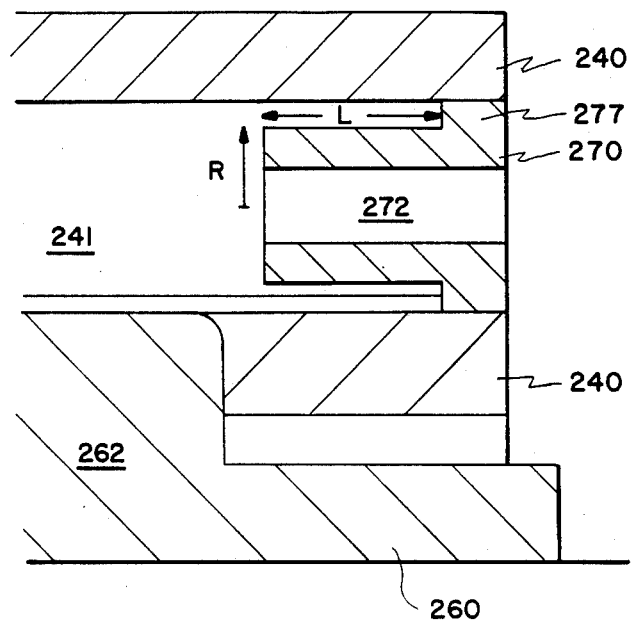
FIG. 3 is a partial top view of the anode-cathode position.
Figure 4:
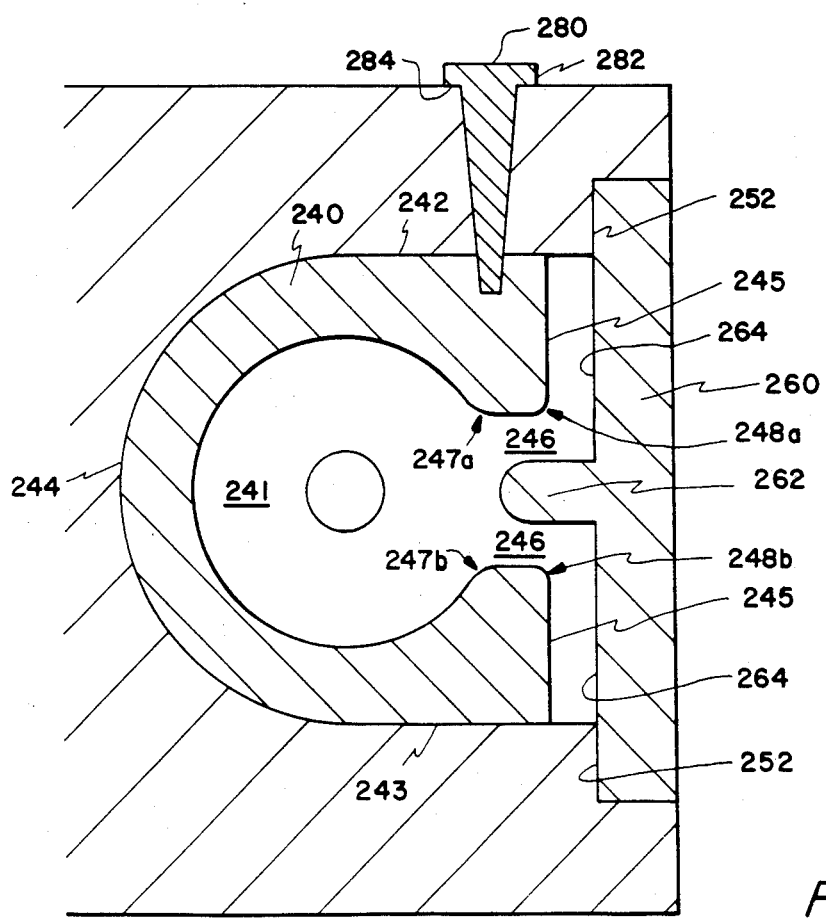
FIG. 4 is an end view of the ring laser block of FIG. 2 illustrating the position of the hollow cathode relative to the anode with the end caps removed.

Referring now to FIGS. 2-4, block 211 is machined or milled on side 251 to fit a cathode 240 and anode 260. Cathode 240 provides a hollow cathode configuration having a centrally located tubular shaped cathode cavity 241, having a selected inner radius of curvature and centrally aligned with tunnel 15. The exterior of cathode 240 includes flat surfaces 242 and 243 joined by an outer surface 244 having an outer radius of curvature and having the same center of curvature as the inner radius of curvature. Cathode 240 also includes end surface 245 which includes an entrance slot 246. It should be understood that the exterior surfaces of cathode 240 are preferably shaped to match the contour of the cavity in block 211 to create a tight fit therebetween. However, any means to secure cathode 240 to block 211 is within the scope of the invention.

The dimensions of the inner radius of curvature of cavity 241 may be in the order of 0.125 inches and outer radius of curvature may be in the order of 0.25 inches, although these dimensions are only exemplary. It should be understood that the hollow cathode cavity 241 may also be constructed in a fashion, shape and dimensions other than shown herein and is within the scope of the present invention.

Side 251 of block 211 is machined to provide a supporting surface 252 to hold anode 260. Anode 260, as illustrated, is a rectangular-shaped anode having a protrusion or tongue 262. Anode tongue 262 protrudes from the rectangular anode such that the tip of the tongue passes through slot 246 and is in the proximity of the edge of tubular cavity 241. The dimensions of anode 260 and cathode 240 are selected so that the interior flat surface portion 264 of anode 260 and cathode surface 245 are spatially separated to electrically isolate cathode 240 from anode 260. This spatial separation is provided to prevent sputtering of cathode 240 onto anode 260 which could cause a short between cathode 240 and anode 260.

At both ends of cathode 240 are identical end caps 270 which are inserted and tightly fitted into the ends of tubular cavity 241 as shown in FIG. 3. (End caps 270 are omitted in the drawing of FIG. 4.) End cap 270 includes a passage 272 aligned with the tubular cavity 241 and tunnel 215. End caps 270 also include a cylindrical member 275 having a radius "R" which is less than the radius of tubular cavity 241 and extends the length "L" away from cylindrical end member 277.

The end caps are utilized to control sputtering of the cathode to other surfaces extending beyond the cathode, particularly along tunnel 15. These end caps are intended to strictly define a cathode area and current path. Additionally, slot edges 247a, 247b, 248a, and 248b of cathode 240 are shown rounded to produce a more uniform field emission as well as minimize sputtering.

Cathode 240 is held in place by an electrically conductive pin 280 which makes electrical contact with cathode 240. Pin 280 includes a flange portion 282 which is held may be held in place by an indium seal 284 which also serves as a gas tight seal.

In operation, an electrical supply voltage has its negative side connected to pin 280 and its positive side thereof electrically connected to anode 260. The cathode-anode configuration, as illustrated, creates a hollow cathode discharge having a negative glow discharge region substantially along the length of the cathode and in the tubular cathode cavity 241. The discharge, i.e. the discharge current, created in practice of the present invention results in a gas flow which is essentially transverse to the path of the laser beams. Operation of the ring laser in this manner greatly minimizes any positive column generated gas flow and a discharge current direction which is collinear with the laser beams of the prior art ring laser angular rate sensors. The physical properties of the hollow cathode in accordance with the present invention are particularly described in three publications by D. J. Sturges and H. J. Oskam, J. Applied Physics, No. 35 (1964), J. Applied Physics, No. 37 (1966), and Physical, No. 37 (1967). These references are incorporated herein by reference thereto.

The structure, as illustrated in FIGS. 2-4, is advantageous in ring lasers, and specifically in ring laser gyros since they eliminate the flow bias known in prior art ring lasers which utilize the positive column discharge. The elongated, transverse anode-cathode arrangement of the present invention provides for lower operating and start-up voltages because of the elimination of the positive column region of the discharge in ring lasers of the prior art which utilize the positive column discharge. The hollow cathode-anode configuration of the present invention reduces or eliminates exposure of the mirrors in a ring laser to the plasma normally created by a positive column discharge. Further advantages of the hollow cathode arrangement of the present invention allows the possibility for an increase in electron energy which will thereby increase the population ratio of the helium singlet to triplet, thus decreasing the quantum noise sum in the laser gyro. Further, the larger ion density created in a hollow cathode discharge allows possible lasing transitions from ionized states of atoms and/or molecules in the ultra-violet region. For example, in lasers which utilize $Ne^+$ excited states, the large ion density allows the 332nm line as an allowable lasing transition.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

The details of the embodiment of the invention just described in FIGS. 2-4 is only exemplary in nature. Particularly, a "tubular shaped cavity" 241 is herein meant within the scope of the present invention to include a wide variety of shaped cavities including, among others, circular, elliptical, pear-shaped, rectangular, and the like. The tubular cavity may be single-slotted as illustrated or may have multiple slots or perforations. The design of the hollow cathode-anode construction in accordance with the present invention is one which allows the creation of a glow discharge region and permits the initiation and propagation of laser beams through the glow discharge region in a direction transverse to the direction of the discharge current. Further, the glow region generated may be the negative glow region, the Faraday dark space, or the like.

Figure 5:
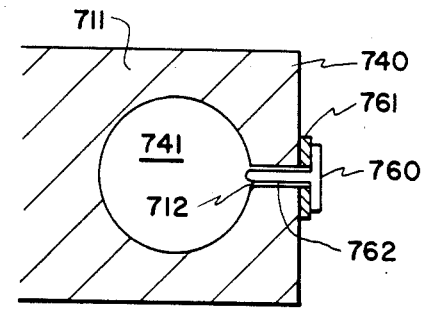
FIG. 5 is an end view of an alternate arrangement of FIG. 4 in accordance with the present invention.

The block and cathode arrangement illustrated particularly in FIGS. 2-4 may be combined in a unitary design such that the block serves also as the cathode as illustrated in FIG. 5. FIG. 5 is similar to FIG. 3 except that cathode 240 is combine with block 211. In FIG. 5, laser block 711, similar to block 211, is of a electrically conductive material. The block is bored to provide a tubular cavity 741, similar to cavity 241 in FIG. 3. Tubular cavity 741 may serve the same function as cathode 240 and cavity 241. A slot 712 is cut in block 711 to provide a passageway from the outside of block 711 to tubular cavity 741. An anode 760, similarly shaped as anode 260, is secured to block 711 with an insulating material 761 between anode 760 and block 711 to provide a gas tight seal. Anode 762 includes tongue shaped member 762, similar to member 262 of anode 260. With a negative supply voltage applied to block 711 and positive supply voltage applied to anode 760, the structure as illustrated in FIG. 5 functions in substantially the same manner as the structure illustrated in FIGS. 2 through 4.

It should be recognized that a cathode may be provided by the structure illustrated in FIG. 5 in which block 711 is electrically nonconductive and in which tubular cavity is coated with an electrically conductive material.

Figure 6:
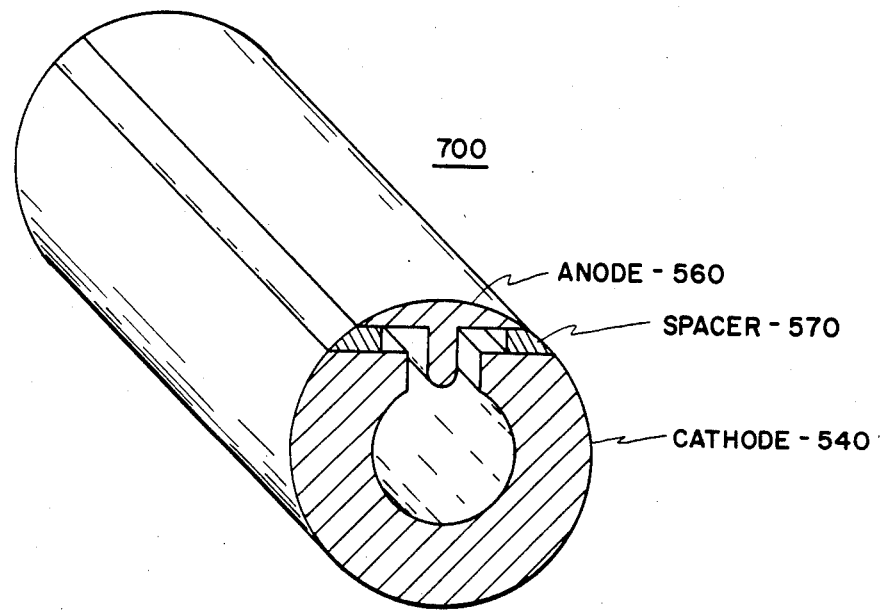
FIG. 6 is a plan view of another anode-cathode configuration in accordance with the present invention.
Figure 7:
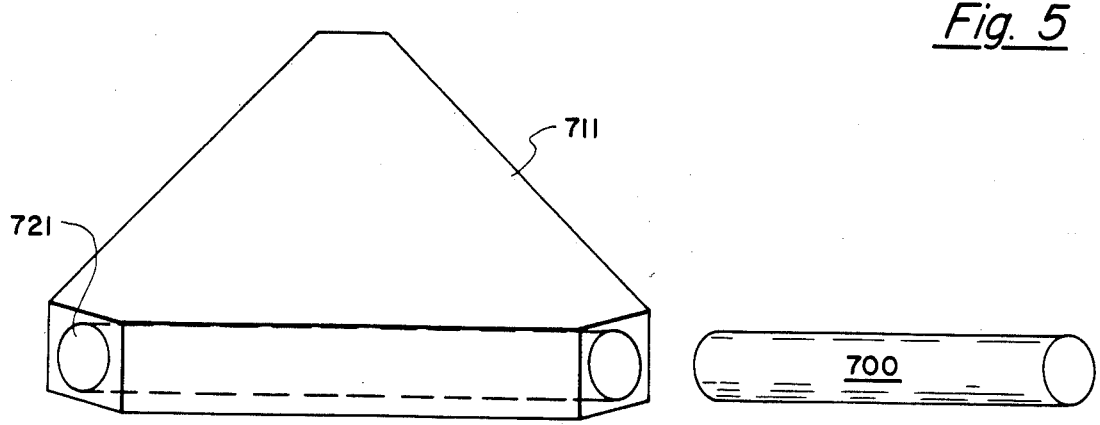
FIG. 7 is a plan view of a ring laser utilizing the anode-cathode configuration of FIG. 7.

Further, the anode-cathode arrangement illustrated in FIG. 2 may be also provided by an arrangement as particularly shown in FIGS. 6 and 7. FIG. 6 illustrates a cylindrical hollow cathode-anode assembly 700 comprised of a horseshoe-shaped cathode 540, anode 560 and spacer 570. End caps, like those shown previously have been omitted the drawing. The cylindrical-shaped assembly may then be inserted into a ring laser block 711 having a tunnel or passage 721 with a diameter sufficient to receive cylindrical assembly 700. The assembly 700 provides for the laser tunnel 215 illustrated in FIG. 2 through passage 715. Electrically conductive pins, not shown, may be utilized to provide electrical contact to the anode and cathode and for securing assembly 700 in place.

Preferably, the hollow cathode is comprised of an electrically conductive metallic material, or alternatively may be, a low thermal expansion material such as Invar with a sputtered aluminum coating.

Alternate arrangements of how cathode discharge devices are further illustrated in detail in U.S. Pat. No. 4,287,484, issued to Wang et al, and U.S. Pat. No. 4,380,078, also issued to Wang et al.

Although the embodiment shown in FIG. 2 shows the use of a single hollow cathode-anode configuration in accordance with the present invention, a symmetrically placed pair of hollow cathode-anode configurations is also within the scope of the present invention. For example, in FIG. 2, a pair of hollow cathode-anodes, 240-260, may be positioned in the two legs of the triangular-shaped cavity adjacent to the hollow cathode-anode shown. Lastly, although the Figures illustrate a triangular ring laser configuration, any closed loop resonant cavity configuration, particularly rectangular, is also within the scope of the present invention.

We claim:

1. A ring laser comprising:
   a gas impervious block containing at least three tunnels meeting to form, at least in part, a closed-loop gas containing cavity, said block constructed, in part, to provide a first electrode, said block including a tubular cavity axially aligned with a first one of said tunnels, said block including a slot aligned with said first tunnel and said tubular cavity, and said slot extending from an outside surface of said block to said tubular cavity;
   electromagnetic wave reflecting surfaces, forming, in part, said cavity, for reflecting a pair of counter-propagating laser beams to propagate along said closed-loop cavity substantially defined by said tunnels;
   a gas contained within said closed-loop cavity;
   said tubular cavity having an electrically conductive surface to provide a first electrode adapted to be electrically connected to a negative supply voltage;
   a second electrode fixed to said block, adapted to be electrically connected to a positive supply voltage relative to said negative supply voltage, said second electrode including an electrically conductive member aligned with said tubular cavity, said second electrode having a portion thereof fixed to said block to cover said slot, said second electrode including an electrically conductive member extending into said block and aligned with said tubular cavity and said slot, and in close proximity to said tubular cavity; and
   said first and second electrodes positioned relative to each other to support a discharge current through said gas and establish a glow discharge region therebetween to induce a pair of counter-propagating laser beams to propagate through said glow discharge region in a direction transverse to the direction of said discharge current.

2. The ring laser block of claim 1 wherein said block is comprised of an electrically conductive material.

3. A ring laser comprising:
   a gas impervious block containing at least three tunnels meeting to form, at least in part, a closed-loop gas containing cavity, said block constructed, in part, to provide a first electrode, said block including a tubular cavity axially aligned with a first one of said tunnels, said block including a slot aligned with said first tunnel and said tubular cavity, and said slot extending from an outside surface of said block to said tubular cavity;
   electromagnetic wave reflecting surfaces, forming, in part, said cavity, for reflecting a pair of counter-propagating laser beams to propagate along said closed-loop cavity substantially defined by said tunnels;
   a gas contained within said closed-loop cavity;
   said tubular cavity having an electrically conductive surface to provide a first electrode adapted to be electrically connected to a negative supply voltage;
   a second electrode fixed to said block, adapted to be electrically connected to a positive supply voltage relative to said negative supply voltage, said second electrode including an electrically conductive member aligned with said tubular cavity, said second electrode having a portion thereof fixed to said block to cover said slot, said second electrode including an electrically conductive member extending into said block and aligned with said tubular cavity and said slot, and in close proximity to said tubular cavity; and
   said first and second electrodes positioned relative to each other to support a discharge current through said gas and establish a negative glow discharge region therebetween to induce a pair of counter-propagating laser beams to travel through said negative glow discharge region and along said closed-loop cavity.

4. The ring laser block of claim 3 wherein said block is comprised of an electrically conductive material.

5. A ring laser angular rate sensor comprising:
   a gas impervious block containing at least three tunnels meeting to form, at least in part, a closed-loop gas containing cavity, said block constructed, in part, to provide a first electrode, said block including a tubular cavity axially aligned with a first one of said tunnels, said block including a slot aligned with said first tunnel and said tubular cavity, and said slot extending from an outside surface of said block to said tubular cavity;

electromagnetic wave reflecting surfaces, forming, in part, said cavity, for reflecting a pair of counter-propagating laser beams to propagate along said closed-loop cavity substantially defined by said tunnels;

a gas contained within said closed-loop cavity;

said tubular cavity having an electrically conductive surface to provide a first electrode adapted to be electrically connected to a negative supply voltage;

a second electrode fixed to said block, adapted to be electrically connected to a positive supply voltage relative to said negative supply voltage, said second electrode including an electrically conductive member aligned with said tubular cavity, said second electrode having a portion thereof fixed to said block to cover said slot, said second electrode including an electrically conductive member extending into said block aligned with said tubular cavity and said slot, and in close proximity to said tubular cavity; and said first and second electrodes positioned relative to each other to support a discharge current through said gas and establish a negative glow discharge region therebetween to induce a pair of counter-propagating laser beams to propagate through said glow discharge region in a direction transverse to the direction of said discharge current; and means for providing an output signal representative of the frequency difference between said laser beams.

6. The ring laser angular rate sensor block of claim 5 wherein said block is comprised of an electrically conductive material.

* * * * *